(12) United States Patent
Belmonte Mula

(10) Patent No.: US 10,034,440 B2
(45) Date of Patent: Jul. 31, 2018

(54) FACILITY FOR HYDROPONIC CULTIVATION

(71) Applicant: NEW GROWING SYSTEMS, S.L., Pulpi (Almeria) (ES)

(72) Inventor: Manuela Belmonte Mula, Pulpi (Almeria) (ES)

(73) Assignee: NEW GROWING SYSTEMS, S.L. (ES)

( * ) Notice: Subject to any disclaimer, the term of this patent is extended or adjusted under 35 U.S.C. 154(b) by 0 days.

(21) Appl. No.: 15/545,747

(22) PCT Filed: Feb. 10, 2016

(86) PCT No.: PCT/ES2016/000019
§ 371 (c)(1),
(2) Date: Jul. 24, 2017

(87) PCT Pub. No.: WO2016/128593
PCT Pub. Date: Aug. 18, 2016

(65) Prior Publication Data
US 2018/0014483 A1 Jan. 18, 2018

(30) Foreign Application Priority Data

Feb. 10, 2015 (ES) .................................. 201500105

(51) Int. Cl.
*A01G 31/00* (2018.01)
*A01G 31/02* (2006.01)
*A01G 24/50* (2018.01)

(52) U.S. Cl.
CPC .............. *A01G 31/02* (2013.01); *A01G 24/50* (2018.02); *A01G 2031/002* (2013.01); *A01G 2031/006* (2013.01)

(58) Field of Classification Search
USPC .......................... 47/62 C, 59 R, 62 R, 63, 82
See application file for complete search history.

(56) References Cited

U.S. PATENT DOCUMENTS

| 3,739,522 A | * | 6/1973 | Greenbaum | ........... A01G 9/104 47/87 |
| 3,823,508 A | * | 7/1974 | Takehara | ............... A01G 31/02 47/63 |
| 4,291,499 A | | 9/1981 | Prewer | .............................. 47/59 |

(Continued)

FOREIGN PATENT DOCUMENTS

| EP | 0937386 | * | 8/1999 | ............. A01G 31/02 |
| ES | 2 061 409 A1 | | 12/1994 | |

(Continued)

OTHER PUBLICATIONS

International Search Report dated May 4, 2016 in corresponding PCT International Application No. PCT/ES2016/000019.

(Continued)

*Primary Examiner* — Andrea Valenti
(74) *Attorney, Agent, or Firm* — Ostrolenk Faber LLP

(57) ABSTRACT

The facility has a pair of side bars (1,1) acting as inclined supports for an upper sheet (2) with openings (8) for inserting the plants, a closed lower sheet (4) acting as a collector, and at least one intermediate sheet (3) with openings determining a cascade trajectory for the water with the nutrients. The multi-layer upper sheet (2) preferably includes four layers (2a, 2b, 2e and 2d), which together define narrow channels (7) such that at insertion, the root of each plant is placed in a channel (7) different from that used by the adjacent plants. The openings (8) for the insertion of the plants form two marginal and longitudinal lines, so than the roots of adjacent plants can be completely isolated during the first growth phase thereof, preventing interference therebetween and allowing plants with different growth rates and even different types of plants to be arranged on the facility, generating, in turn, continuous production and an improved yield from the facility.

8 Claims, 3 Drawing Sheets

(56) References Cited

U.S. PATENT DOCUMENTS

| | | | | |
|---|---|---|---|---|
| 4,392,327 A | * | 7/1983 | Sanders | A01G 31/02 47/59 R |
| 4,937,973 A | * | 7/1990 | Schilling | A01G 9/1086 47/64 |
| 6,195,938 B1 | * | 3/2001 | Kay | A01G 9/1006 47/65.8 |
| 6,216,390 B1 | * | 4/2001 | Peregrin Gonzalez | A01G 31/02 47/62 R |
| 6,276,089 B1 | * | 8/2001 | Boisclair | A01G 31/02 47/60 |
| 6,405,481 B1 | * | 6/2002 | Bautner | A01G 9/104 47/65.8 |
| 2008/0028678 A1 | * | 2/2008 | Banhagel | A01G 9/02 47/73 |
| 2014/0259910 A1 | * | 9/2014 | Dunn | A01G 9/02 47/65.5 |

FOREIGN PATENT DOCUMENTS

| | | | | |
|---|---|---|---|---|
| ES | 2 125 803 A1 | | 3/1999 | |
| ES | 2 142 254 A1 | | 4/2000 | |
| ES | 2284378 A1 | * | 1/2007 | A01G 31/02 |
| ES | 2 282 044 A1 | | 10/2007 | |
| ES | 2 284 378 A1 | | 11/2007 | |

OTHER PUBLICATIONS

Written Opinion dated May 4, 2016 in corresponding PCT International Application No. PCT/ES2016/000019.

* cited by examiner

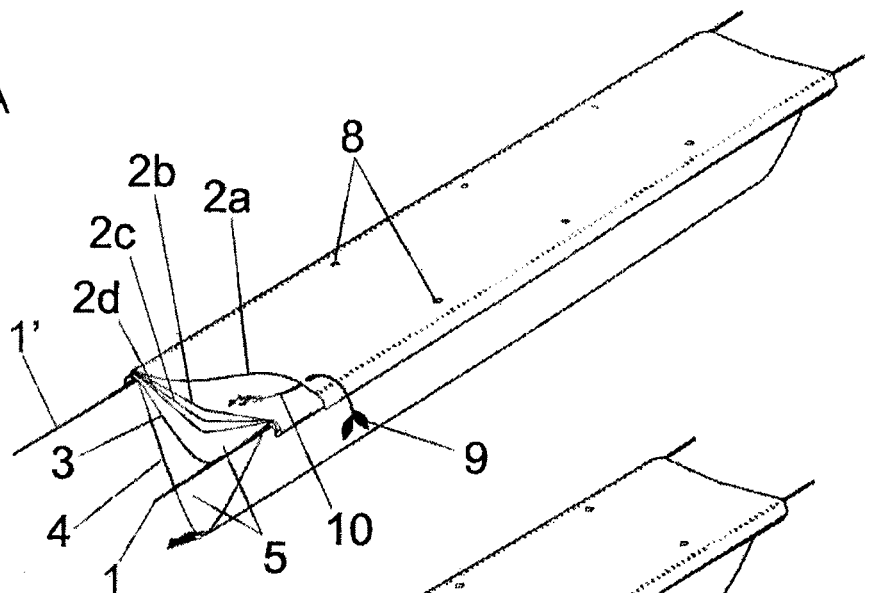
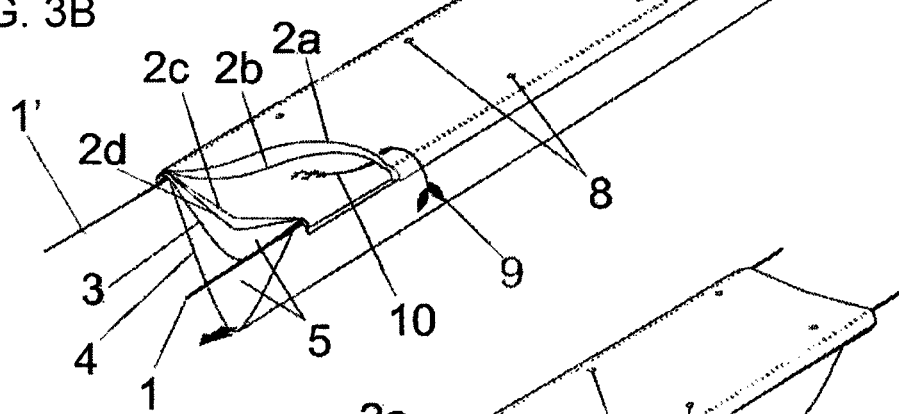
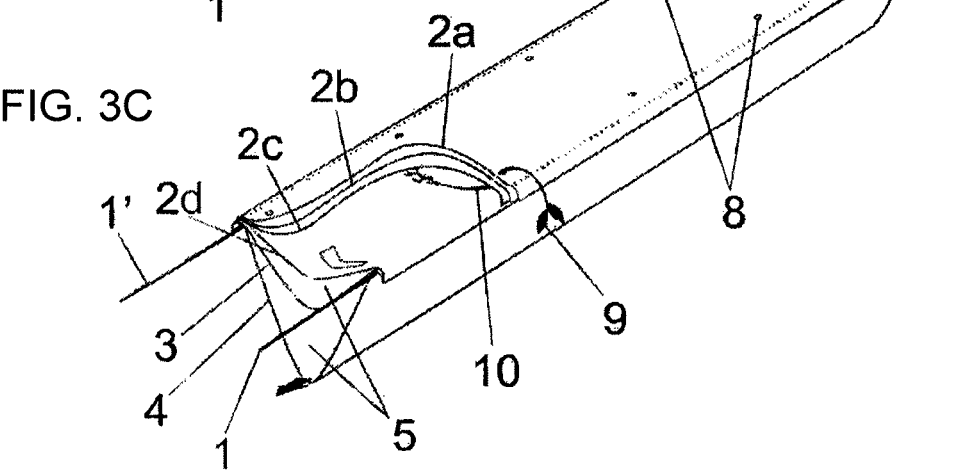

FACILITY FOR HYDROPONIC CULTIVATION

CROSS-REFERENCE TO RELATED APPLICATIONS

The present application is a 35 U.S.C. §§ 371 national phase conversion of PCT/ES2016/000019, filed Feb. 10, 2016, which claims priority of Spain Application No. P201500105, filed Feb. 10, 2015, the contents of which are incorporated by reference herein. The PCT International Application was published in the Spanish language.

TECHNICAL FIELD

The present invention refers to a facility for hydroponic cultivation, that is, for growing plants without soil, using inert supports to allow the plant to take root and to provide nutrients by means of a closed circuit of liquid fertilizer, to which the nutrients that must be replaced after being absorbed by the plants are periodically added.

The object of the invention is to significantly improve the yield of the facility thanks to the capacity of planting on the facility plants with different rates of growth, which may reach their optimal growth or state of fruit production in staggered phases in time, with the aim of achieving a continuous production.

The invention is therefore in the field of agriculture, more specifically in the production of fruits and vegetables. It can also be used for outdoor cultivation.

BACKGROUND OF THE INVENTION

As it is commonly known, hydroponic cultivation consists of an artificial procedure of cultivation without soil, which is carried out on a support structure where a plant with small roots is placed, which is provided with liquid fertilizer with a formulation suitable for the nutritional needs of the specific type of plant grown, so that with appropriate light, which may also be artificial, the suitable concentration and proportion of nutrients dissolved in water provide the optimal growth conditions for the plant, and in consequence, the yield of the plants is far better than that of traditional systems.

At the same time, it also has a series of other advantages such as higher plantation density, perfect protection of the roots and the plant as a whole against the action of pathogen agents, etc.

The applicant is the owner of the Spanish Invention Patent with application number ES 2 125 803, which describes a procedure of hydroponic cultivation and the complementary device for putting it into practice of which the present invention is an improvement.

More specifically, in a facility with this procedure, a series of suspended channels is placed on parallel filiform supports. These channels comprise an upper sheet with orifices in which to plant the respective plants, a lower sheet without orifices that acts as collector, and intermediate sheets that comprise a series of upper orifices, but these are offset longitudinally in their sheets depending on the plants to be cultivated. The channels are connected to a pipe feeding them water and nutrients and controlling growth of plants and temperature. Micro-pipes or similar protrude from the level of the upper sheet of the pipe for each irrigation unit, that is, for each plant, so that they are watered individually. The liquid cascades down through the channels by means of the staggered orifices until it reaches the lower channel, and the orifices direct in turn the roots of the plants along the same path taken by the nutrients.

A facility of this type is suitable for a monoculture of a determined type of plants, that is, for a plurality of plants identical to each other. But, it is not ideal for growing plants with different growth rates or of different species, since their roots quickly become in contact with each other, which results in interactions that harm some of the plant in relation to others.

DESCRIPTION OF THE INVENTION

The facility proposed by the invention addresses this problem, making it possible to simultaneously grow plants with different growth rates or of different species, without causing negative interactions between them. As explained above, this makes it possible to substantially increase the yield of the facility, in addition to achieving continuous production or cultivation.

In order to achieve the results described, the facility retains basically all the characteristics of the Patent cited above, in regard to the existence in the patent of a pair of threads, lateral bars or a rigid channel, which determine the means for supporting several sheets constituting respective overlapping channels of an indefinite length, forming dihedrals of different angles, which due to their angles, configure overlapping channels with a common mouth. The upper sheet comprises orifices that correspond with the place where the plants are placed, the lower sheet is closed, while the intermediate sheet or sheets are provided with orifices also matching the distance between the plants and that are offset with those of the upper sheet in order to achieve a cascade effect, based on a certain longitudinal inclination given to the entire facility, more specifically to the threads, bars or the rigid channel supporting the sheets.

Obviously this "cascade" effect refers to the trajectory of the liquid fertilizer supplied by a pipe running along the length of the facility, which is collected by the lower sheet or channel after coating the roots, in order for the fertilizer to be recycled.

Therefore, from this basic configuration and according to the invention, the upper sheet adopts a multi-layer structure, for example, structured in four layers separated at a noticeable distance, although separated at a much smaller distance than the different sheets of the facility, with the upper layer of this sheet comprising orifices separated at convenient distances according to the expected separation between plants, while the rest of the layers of this upper sheet comprise die cuts or fold lines that face the aforementioned orifices and that can be easily torn off, so that when the plant is placed in the facility using the plant itself as a perforating element, one or more of the aforementioned die cuts, or none, may be torn off in order to place the roots of the plant at the level selected for each plant, physically isolating them from the rest of the plants.

According to another characteristic of the invention, the design of the aforementioned orifices of the upper sheet and the complementary die cuts form two marginal lines in the context of the sheet, makes the most of the space available.

A water inlet with multiple outlets is placed alongside every orifice and complementary die cuts of the upper sheet, one outlet for each layer, and the cuts open at each point the relevant outlet for the space provided for the corresponding plant to take root in.

In each segment of the upper sheet corresponding to a plant, where each plant is placed in the highest level according to the inclination of the facility, there is an orifice in the opposite end of the segment, that is, the lowest level, that only affects the lower layers, and it does not affect the upper layer, and water falls through this orifice to the second sheet, cascading down until it reaches the lower sheet. This orifice is also used by the corresponding plant when the roots thereof reach a predetermined length in order to allow the roots thereof to reach down to the lower sheets, in the same way as in the Patent cited above.

DESCRIPTION OF THE DRAWINGS

To complete the invention described and in order to give a better understanding of the characteristics of the invention, according to a preferred embodiment thereof, this description is accompanied by a set of drawings in which the figures described below have been represented, for purely illustrative purposes and should not be construed as limiting:

FIGS. 3A, 3B and 3C show representations similar to the one shown in FIG. 1, featuring one of three options for planting the roots of the plant in the different respective levels at the heart of the multi-layer sheet at the moment of planting them.

PREFERRED EMBODIMENT OF THE INVENTION

Figure 1:
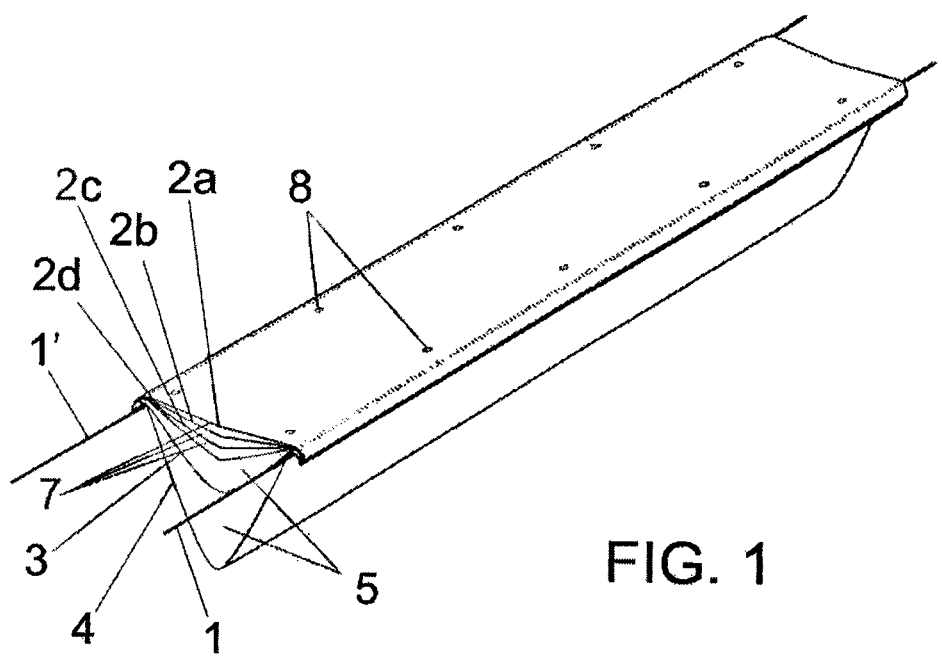
FIG. 1 shows a partial perspective view of a facility for hydroponic cultivation according to the object of the present invention.
Figure 2:
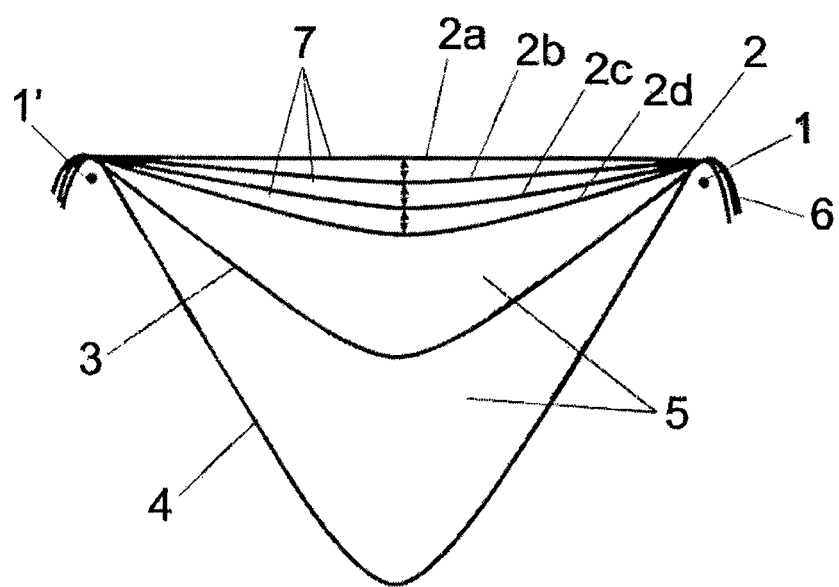
FIG. 2 shows a transverse cross section of the assembly represented in FIG. 1.

FIGS. 1 and 2, show that the facility proposed in the invention is constituted by a pair of parallel and longitudinal threads or bars (1, 1'), which constitute the physical support of the multiple channels that comprise a multi-layered upper sheet (2), at least one intermediate sheet (3), and a lower sheet (4), made of different widths in order to create respective channels (5) configured noticeably in the shape of dihedrals, secured to the bars (1, 1') by means of marginal folds (6) represented in a scheme of the drawings.

The upper sheet (2) is multi-layered, so that it is comprised, for example, of four layers (2a, 2b, 2c and 2d). Each of these layers is also made of different widths so that significantly smaller channels (7) are defined between them, specifically channels smaller in height in comparison to the channels (5) defined between the different sheets (2, 3, 4).

Figure 4:
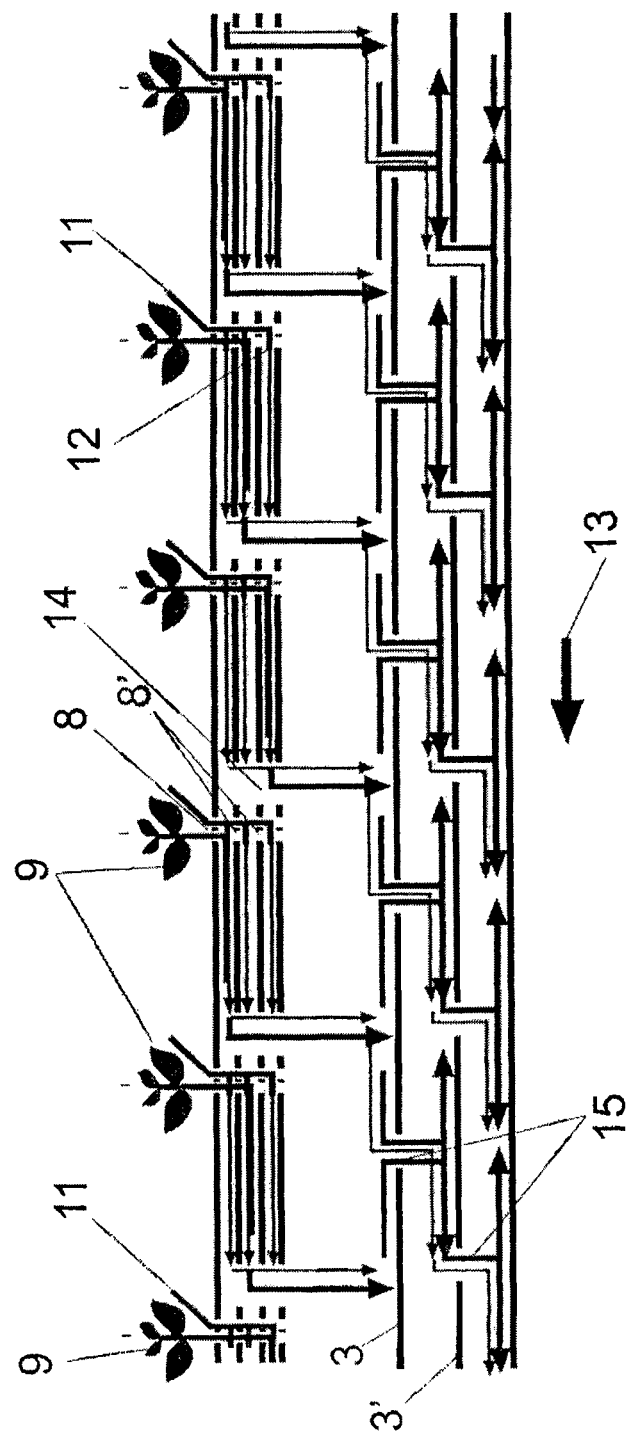
FIG. 4, finally, shows a longitudinal schematic view of a segment of the facility.

The upper layer (2a) of the upper sheet (2) comprises two marginal lines of orifices (8) conveniently separated according to the planned separation between plants (9), and the die cuts (8') are located under these orifices (8) and they affect the other three layers (2b, 2c and 2d) of the sheet (2) The die cuts are initially closed and are easily torn off when the plants are planted so that the roots of each of the plants can be placed on any of the three levels (7) defined by the aforementioned layers (2b, 2c and 2d), as shown in FIG. 4, depending on the choice of the farmer, and on a respective different level than the adjacent plants. The roots of the plant themselves act as a puncher to tear off the die cut or die cuts needed in order to gain access to the planned level.

A multiple water inlet (11) is placed alongside every orifice (8), which is individualized for each plant, with three independent outlets (12), each of them facing each of the spaces or channels (7) defined by the different layers of the sheet (2).

The roots are then placed on the same level of the multi-layered sheet (2) as the water carrying nutrients, and they are completely independent from the roots of the rest of the plants during the initial stage of growth, which is long enough so that no interference takes place between plants, and so each plant, following the direction of the inclination (13), finally reaches an orifice (14). This simultaneously affects the three lower layers (2b, 2c and 2d) of the sheet (2), from where the water carrying nutrients and the roots descend to the intermediate sheet (3), and from that sheet, with the possibility of there being another layer of intermediate sheets (3'), they descend to the closed lower sheet (4) that acts a collector, all of which takes place through the orifices (15) of said sheets (3, 3'), which determine the circulation of the water with nutrients cascading down, and an identical trajectory for the roots.

The invention claimed is:

1. A facility for hydroponic cultivation of plants, the facility comprising:
   a pair of spaced apart supports which together comprise a physical support for an upper sheet;
   the upper sheet including first orifices configured for planting the plants at the upper sheet orifices;
   a closed lower sheet spaced from and below the upper sheet;
   at least one intermediate sheet between the upper sheet and the lower sheet;
   each intermediate sheet forming a series of dihedral channels connected for cascading down of a liquid via second orifices formed in the one or more intermediate sheets for providing the cascading;
   the upper sheet comprises a multi-layered sheet comprising a plurality of layers separated and positioned such that each pair of layers defines between the pair of layers an independent channel of a height selected for planting of roots of the plants;
   each remaining layer of the plurality of layers of the multi-layered sheet comprises die cuts or fragile fold lines positioned below the first orifices; and
   each die cut or fragile fold line positioned to face an orifice of the first orifices, and configured to be torn off, so that the roots of each plant reach the respective channel, the respective channel chosen by a user, and different from a channel containing the roots of others of the plants.

2. A facility for hydroponic cultivation according to claim 1, wherein the upper sheet includes two marginal areas, a first marginal area extending along a longitudinal direction of the upper sheet at a first lateral area, and a second marginal area extending along a longitudinal direction of the upper sheet at a second lateral area of the upper sheet, and wherein the first orifices and the die cuts or fragile fold lines are located along the two marginal areas on the upper sheet.

3. A facility for hydroponic cultivation according to claim 2, wherein the marginal areas comprise longitudinal lines.

4. A facility for hydroponic cultivation, according to claim 1, further comprising:
   a multiple water inlet placed over the upper sheet and in correspondence with the first orifice,
   wherein the plurality of layers of the multi-layered sheet define at least two channels, and
   the multiple water inlet comprises water outlets, each water outlet positioned and configured for watering a respective channel of the at least two channels, the respective channel selected by the user for cooperating with a respective water outlet of channels.

5. A facility for hydroponic cultivation according to claim 1, wherein the second orifices are placed at the ends of the channels corresponding to each plant and at the lowest point of the channels in one direction, the first orifices affecting the three upper layers and connecting the channels of the upper sheet with the channels defined by the intermediate sheets and with the closed lower sheet, and wherein the channels defined by the intermediate sheets are configured to convey the water carrying nutrients such that the water carrying nutrients cascades down parallel to a trajectory of the roots of the plants.

6. A facility for hydroponic cultivation according to claim 1, wherein each support comprises a longitudinal support.

7. A facility for hydroponic cultivation according to claim 6, wherein each support comprises a pair of parallel, spaced apart and longitudinal threads, bars or a rigid channel with an inclination.

8. A facility for hydroponic cultivation according to claim 1, wherein the die cuts or the fragile fold lines are configured to be torn off by using the roots of the plant itself as a perforating element.

* * * * *